(12) United States Patent
Zhai et al.

(10) Patent No.: US 10,949,729 B2
(45) Date of Patent: Mar. 16, 2021

(54) STABILIZING APPARATUS FOR PLUG-IN CARD, CHASSIS, AND ASSOCIATED MANUFACTURING METHOD

(71) Applicant: EMC IP Holding Company LLC, Hopkinton, MA (US)

(72) Inventors: Haifang Zhai, Shanghai (CN); David Dong, Shanghai (CN); Hendry Xiaoping Wu, Shanghai (CN); Yujie Zhou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 16/381,794

(22) Filed: Apr. 11, 2019

(65) Prior Publication Data

US 2019/0332914 A1    Oct. 31, 2019

(30) Foreign Application Priority Data

Apr. 28, 2018  (CN) .......................... 201810400289.4

(51) Int. Cl.
  *G06K 19/07*  (2006.01)
  *G06K 19/077*  (2006.01)

(52) U.S. Cl.
  CPC ... *G06K 19/07745* (2013.01); *G06K 19/0772* (2013.01); *G06K 19/07743* (2013.01)

(58) Field of Classification Search
  CPC ............. G06K 19/07735; G06K 13/08; G06K 13/085; G06K 7/0056; G06K 7/0082; H05K 7/10; H05K 7/1007; H05K 7/1422; H05K 7/1424; H05K 7/1427; H05K 7/1461; H05K 7/1467; H05K 5/0256; H05K 5/026; H05K 5/0265; H05K 5/0269; H05K 5/0286
  See application file for complete search history.

(56) References Cited

U.S. PATENT DOCUMENTS

| 5,653,596 | A  | * | 8/1997 | Banakis | ............... | G06K 7/0047 439/64 |
| 6,412,749 | B1 | * | 7/2002 | Supinski | ................. | G06F 1/184 248/674 |
| 7,012,813 | B2 | * | 3/2006 | Wang | ..................... | G06F 1/184 361/753 |

(Continued)

FOREIGN PATENT DOCUMENTS

| CN | 101609375 A | 12/2009 |
| CN | 102216991 A | 10/2011 |

(Continued)

*Primary Examiner* — Thien M Le
*Assistant Examiner* — April A Taylor
(74) *Attorney, Agent, or Firm* — Ryan, Mason & Lewis, LLP (57) ABSTRACT

Embodiments of the present disclosure relate to a stabilizing apparatus for a plug-in card, a chassis including the stabilizing apparatus and associated manufacturing method. The stabilizing apparatus comprises a fixed part adapted for attaching the stabilizing apparatus to a chassis for supporting the plug-in card and a contact part electrically coupled to a ground terminal of the chassis and movable towards the plug-in card supported on the chassis along a first positive direction perpendicular to an extended plane of the plug-in card, so as to contact the plug-in card.

20 Claims, 5 Drawing Sheets

(56) References Cited

U.S. PATENT DOCUMENTS

| | | | |
|---|---|---|---|
| 7,310,241 B2* | 12/2007 | Peng | G06F 1/185 361/679.01 |
| 7,561,440 B2* | 7/2009 | Dai | H05K 7/1408 312/223.2 |
| 8,705,250 B2* | 4/2014 | Liu | G06F 1/186 361/801 |
| 2011/0026235 A1* | 2/2011 | Searby | G06F 1/185 361/810 |
| 2015/0048727 A1* | 2/2015 | Liu | H05K 7/1409 312/223.2 |

FOREIGN PATENT DOCUMENTS

| | | |
|---|---|---|
| CN | 102548299 A | 7/2012 |
| CN | 107482332 A | 12/2017 |
| EP | 0406610 A2 | 1/1991 |
| WO | 2014171303 A1 | 10/2014 |

\* cited by examiner

STABILIZING APPARATUS FOR PLUG-IN CARD, CHASSIS, AND ASSOCIATED MANUFACTURING METHOD

RELATED APPLICATION(S)

The present application claims priority to Chinese Patent Application No. 201810400289.4, filed Apr. 28, 2019, and entitled "Stabilizing Apparatus for Plug-In Card, Chassis, and Associated Manufacturing Method," which is incorporated by reference herein in its entirety.

FIELD

Embodiments of the present disclosure generally relate to a storage system, and more specifically, to a stabilizing apparatus for a plug-in card, a chassis including the stabilizing apparatus and an associated manufacturing method.

BACKGROUND

In the design of a plug-in card for a storage system, electro-static discharge (ESD)/anti-electromagnetic interference (anti-EMI) capability and anti-shock/vibration capability should be particularly considered. This is because the plug-in card usually is a plug-in type and the contact point for fastening the plug-in card to the system and connecting the plug-in card to the chassis usually exists on the connector end and the chassis panel. Therefore, other methods should be adopted to improve electromagnetic compatibility and anti-shock/vibration capability of the plug-in card.

SUMMARY

Various embodiments of the present disclosure provide a stabilizing apparatus for a plug-in card and a chassis including the stabilizing apparatus.

In a first aspect of the present disclosure, a stabilizing apparatus for a plug-in card is provided. The stabilizing apparatus comprises a fixed part adapted for attaching the stabilizing apparatus to a chassis for supporting the plug-in card, and a contact part electrically coupled to a ground terminal of the chassis and movable towards the plug-in card supported on the chassis along a first positive direction perpendicular to an extended plane of the plug-in card, so as to contact the plug-in card.

In some embodiments, the plug-in card comprises an exposed metal part that is electrically coupled to a circuit board in the plug-in card, and the contact part is operable to contact the metal part, so as to electrically couple the plug-in card to the ground terminal.

In some embodiments, the stabilizing apparatus further comprises a transmission pole extending in a second direction perpendicular to the first positive direction, wherein the transmission pole is coupled to the contact part and is adapted for applying a force with a component in the first positive direction to the contact part, in response to a movement of the transmission pole in a second positive direction of the second direction.

In some embodiments, the contact part comprises a first contact surface that is tilted with respect to the second direction by a certain oblique angle, and the transmission pole comprises a second contact surface form-fitted with the first contact surface and disposed opposite to the first contact surface. The second contact surface is adapted to move while abutting against the first contact surface when the transmission pole moves along the second positive direction, so as to move the contact part along the first positive direction.

In some embodiments, the stabilizing apparatus further comprises a hook part coupled to the transmission pole and comprising a bevel face facing towards the second positive direction and an end face facing towards a second negative direction. The second negative direction is oriented opposite to the second positive direction and wherein at least a portion of the hook part is operable to protrude to reach an outer side of an end panel of the chassis to limit via the bevel face a movement of the hook part towards the second positive direction.

In some embodiments, in a state when the contact part contacts the plug-in card, the hook part is operable to retract to an inner side of an end panel of the chassis to limit a movement of the hook part towards the second negative direction by abutting the end face against the inner side.

In some embodiments, the stabilizing apparatus further comprises a first spring coupled to the contact part and adapted for generating a force that resists a movement of the contact part towards the first positive direction and a second spring coupled to the transmission pole and adapted for generating a force that resists a movement of the transmission pole towards the second positive direction.

In some embodiments, the stabilizing apparatus further comprises a manipulation part coupled to the end face of the transmission pole, wherein the manipulation part is operable to: in response to receiving a push operation along the second positive direction, push the hook part to the inner side of the end panel of the chassis, such that the contact part contacts the plug-in card; and in response to receiving a press operation along the first positive direction, release at least a portion of the hook part from the inner side to the outer side, so as to lose the contact between the contact part and the plug-in card.

In some embodiments, during the loss of contact between the contact part and the plug-in card, the first spring is further adapted for moving the contact portion along the first negative direction, wherein the first negative direction is oriented opposite to the first positive direction, and wherein the second spring is further adapted for moving the transmission pole along the second negative direction.

In a second aspect of the present disclosure, a chassis for a plug-in card is provided. The chassis comprises the stabilizing apparatus according to the first aspect of the present disclosure.

In a third aspect, a method for manufacturing the stabilizing apparatus according to the first aspect of the present disclosure is provided.

BRIEF DESCRIPTION OF THE DRAWINGS

The drawings described in the text are provided here to further explain the present disclosure and constitute a part of the present disclosure. Example embodiments of the present disclosure and their descriptions are intended for explaining the present disclosure, rather than restricting the present disclosure inappropriately.

In the drawings, same or similar reference signs indicate same or similar elements.

DETAILED DESCRIPTION

The principle of the present disclosure is now described with reference to the several example embodiments shown in the drawings. Although the example embodiments of the present disclosure are illustrated in the drawings, it should be understood that the embodiments are described merely to enable those skilled in the art to better understand and further implement the present disclosure and is not intended for limiting the scope of the present disclosure in any manners.

As used herein, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment."

Embodiments of the present disclosure provide a stabilizing apparatus for a plug-in card. The stabilizing apparatus can enhance the electromagnetic compatibility and anti-shock/vibration capability of the plug-in card.

Figure 1:
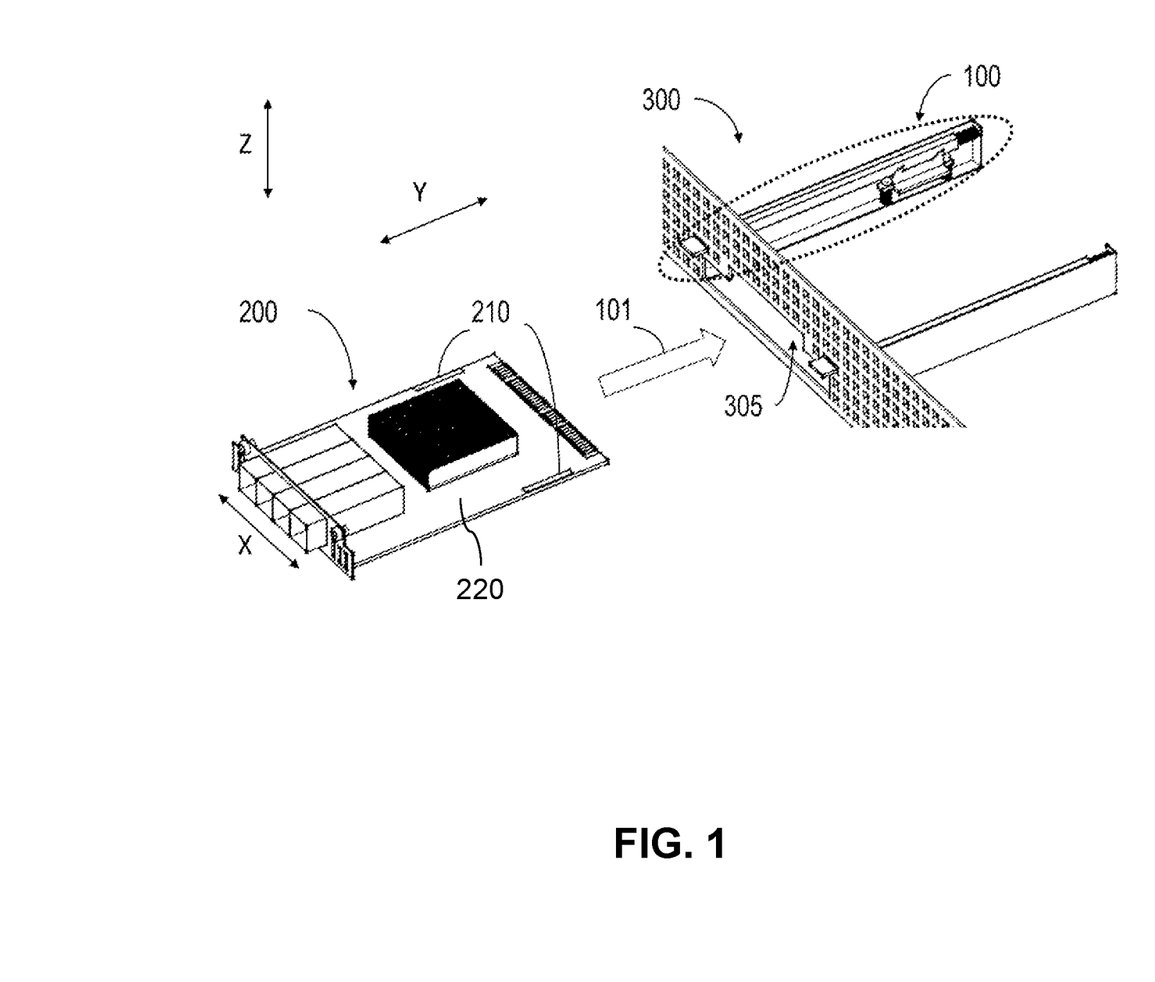
FIG. 1 illustrates a plug-in card, a stabilizing apparatus for the plug-in card and a chassis including the stabilizing apparatus according to an embodiment of the present disclosure.

FIG. 1 illustrates a plug-in card 200, a stabilizing apparatus 100 for the plug-in card 200 according to an embodiment of the present disclosure, and a chassis 300 including the stabilizing apparatus 100 according to an embodiment of the present disclosure. As shown in FIG. 1, the plug-in card 200 can be inserted via a panel opening 305 into the chassis 300 (following a direction indicated by an arrow 101) and supported on the chassis 300.

Figure 2:
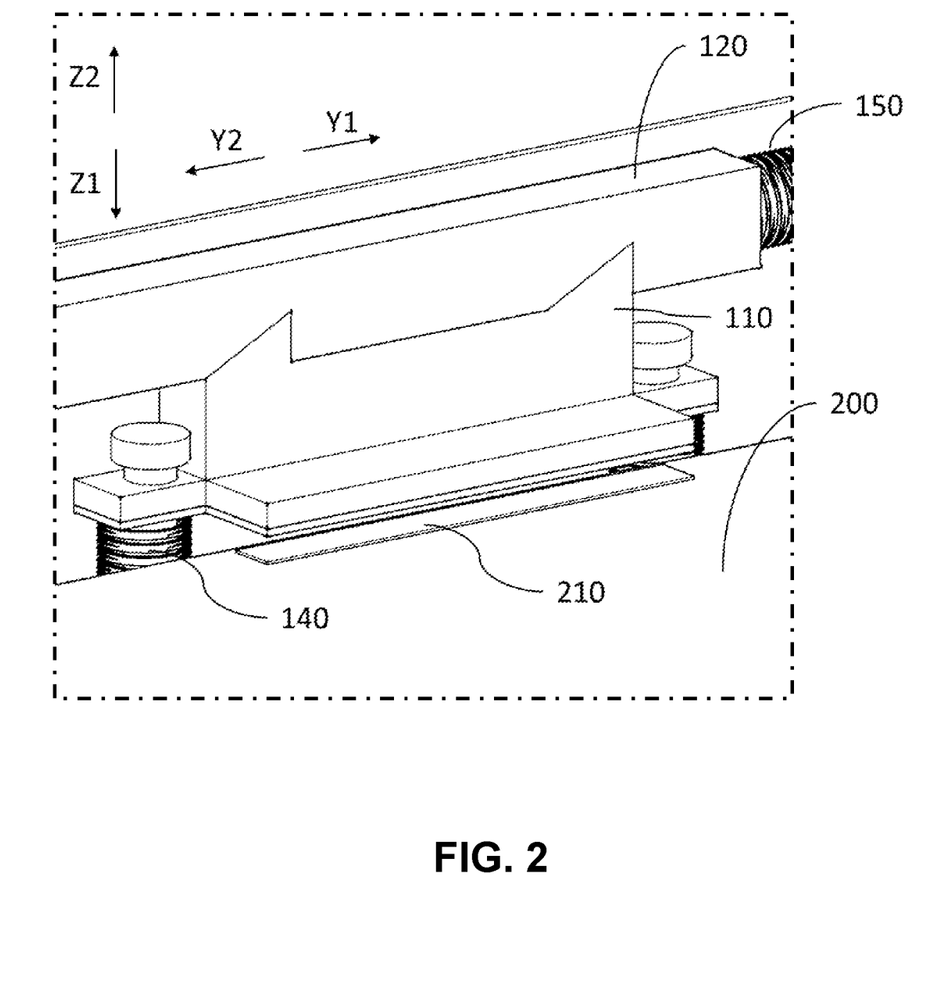
FIG. 2 illustrates a partial view of the stabilizing apparatus in a first state according to an embodiment of the present disclosure.

Referring to FIGS. 1 and 2, the stabilizing apparatus 100 generally includes a fixed part (not shown) for attaching the stabilizing apparatus 100 to the chassis 300, and a contact part 110 that is electrically coupled to a ground terminal (not shown) of the chassis 300 and movable towards the plug-in card 200 in a first positive direction Z1 perpendicular to a plane XY where the plug-in card is located to contact with the plug-in card 200. As such, the movement of the plug-in card 200 in a first negative direction Z2 can be restricted. Here, the first negative direction Z2 is oriented opposite to the first positive direction Z1.

In other words, the contact part 110 together with the fixed part for supporting the plug-in card 200 (which can also be implemented as a part of the chassis) can form a clipper structure to stably clamp the plug-in card 200, thereby, effectively providing a robustness to external shock/vibration.

As further illustrated in FIG. 1, in some embodiments, the plug-in card 200 may include an exposed metal part 210, such as an exposed copper pad. The metal part 210 can be electrically coupled to a circuit board 220 (e.g., printed circuit board) in the plug-in card 200, or can be constructed as a part of the circuit board. Therefore, when the contact part 110 contacts the plug-in card 200, the contact part 110 can directly contact the metal part 210. In the example as shown in FIGS. 1 and 2, both the contact part 110 and the exposed metal part 210 are constructed as a strip having a certain degree of expansion in the XY plane. This could be beneficial since such planar contact via a certain contact area may enable a stable contact.

However, it is to be understood that embodiments of the present disclosure do not seek to limit the shape or positioning of the contact part 110 as well as the exposed metal part 210. Rather, any shape or positioning of contact part 110 and exposed metal part 210 should fall within the protection scope of the present disclosure, as long as they can achieve a stable physical contact.

Through the above-mentioned physical contact between the metal part 210 and the contact part 110, the plug-in card 200 has an improved anti-shock/vibration capability, and the plug-in card 200 can be electrically coupled to the ground in a convenient manner. In this way, the electrostatic charges generated at the plug-in card 200 can be rapidly and reliably discharged via the grounding. Therefore, the potential negative impacts and even damages to the electronic elements on the plug-in card 200 that are caused by the charges can be reduced.

Although the traditional electrostatic charge release can be implemented relying on the contact between the connector end with the chassis front face, such contact is usually unstable or requires components, such as conductive foam, conductive fabric and the like to improve the contact. On the contrary, the contact part 110 of the present disclosure can directly contact the metal part 210 on the plug-in card 200, especially via a planar contact, thereby performing rapid and reliable discharge of electrostatic charges.

In some embodiments as shown in FIG. 2, the stabilizing apparatus 100 may also include a transmission pole 120, which extends in a second direction Y perpendicular to the first positive direction Z1. The transmission pole 120 is coupled to the contact part 110 and can be adapted for executing the following operations, that is, when the transmission pole 120 moves in a second positive direction Y1 of the second direction Y, the transmission pole 120 can apply a force having a component in the first positive direction Z1 to the contact part 110, so as to move the contact part 110 towards the plug-in card 200. FIG. 2 illustrates a partial view of the stabilizing apparatus 100 in a first state. In the context, the "first state" refers to a state when the contact part 110 has not contacted the plug-in card 200 yet (which also referred to as a "released state" of the plug-in card).

Figure 3:
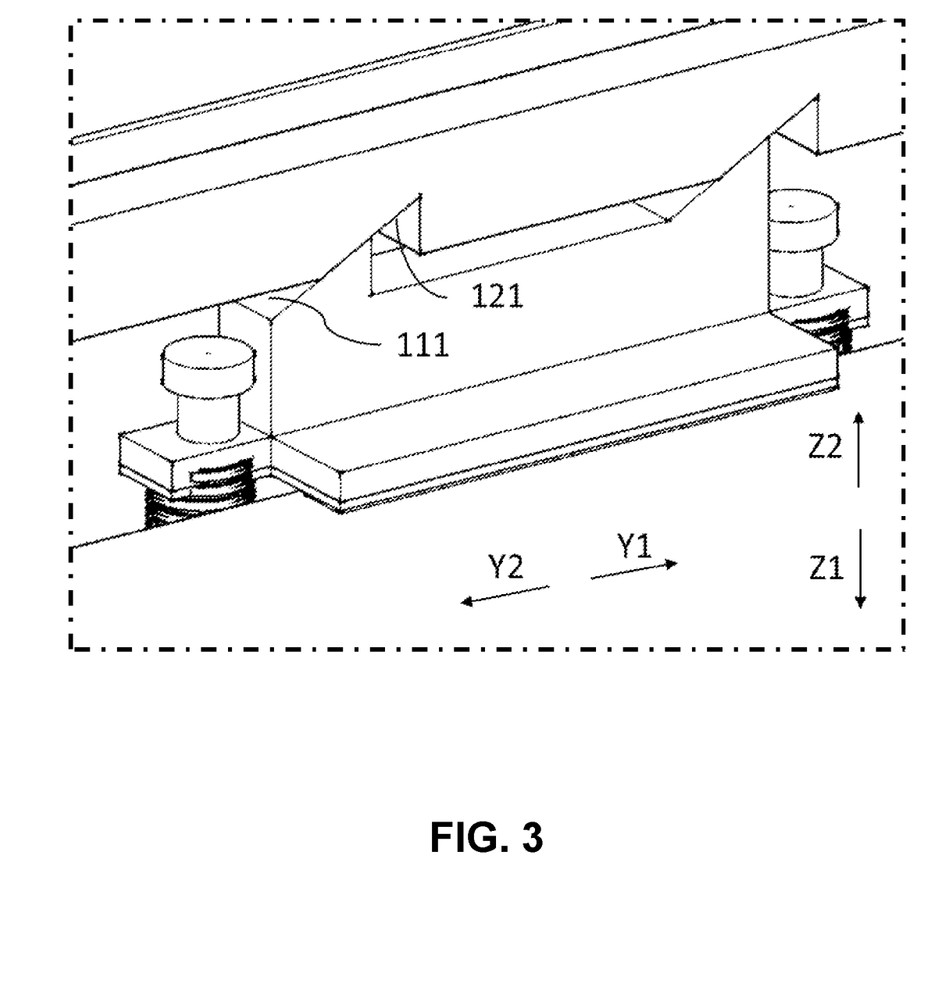
FIG. 3 illustrates a partial view of the stabilizing apparatus in a second state according to an embodiment of the present disclosure.

In some embodiments as shown in FIG. 3, the contact part 110 may include a first contact surface 111 that is titled with respect to the second direction Y by a certain angle. Correspondingly, the transmission pole 120 may include a second contact surface 121 that is form-fitted with the first contact surface 111 and disposed opposite to the first contact surface 111. As such, when the transmission pole 120 moves along a second positive direction Y1, the second contact surface 121 can move while abutting against the first contact surface 111, so as to move the contact portion 110 along the first positive direction Z1, that is, moving towards the plug-in card 200. By means of the planar fitting between the two contact surfaces, a simple and reliable mechanical transmission can be achieved. FIG. 3 illustrates a partial view of the stabilizing apparatus 100 in a second state. In the context, the "second state" refers to a state when the contact part 110 has already contacted the plug-in card 200 (which also referred to as a "locked state" of the plug-in card).

Figure 4:
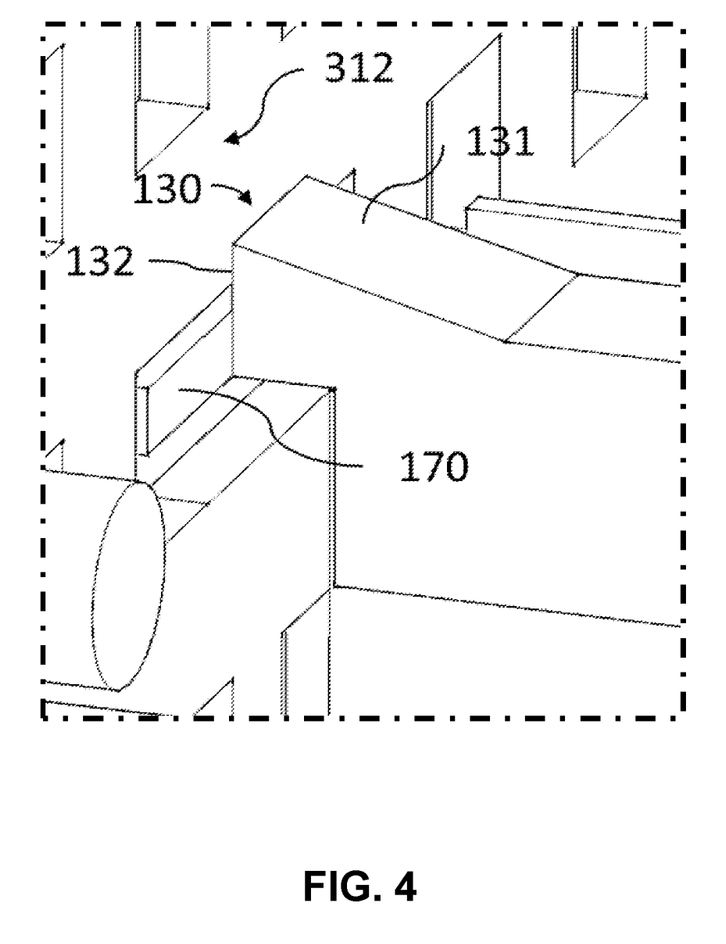
FIG. 4 illustrates an internal, partial view of the stabilizing apparatus according to an embodiment of the present disclosure.

With reference to FIG. 4, in some embodiments, the stabilizing apparatus 100 may also include a hook part 130 that is coupled to or as a part of the transmission pole 120. The hook part 130 includes a bevel face 131 facing towards the second positive direction Y1 and an end face 132 facing towards the second negative direction Y2. Here, the second negative direction Y2 is oriented opposite to the second positive direction Y1.

As shown in FIG. 4, under the first state (that is, when the contact part 110 has not contacted the plug-in card 200 yet), at least a portion of the hook part 130 can protrude to reach an outer side 311 of an end panel 310 of the chassis 300 (see FIG. 5), to limit via the bevel face 131 a movement of the hook part 130 towards the second positive direction Y1. In some embodiments, under the second state (that is, when the contact part 110 has contacted the plug-in card 200), the hook part 130 can retract back to an inner side 312 of the end panel 310 of the chassis 300 to limit the movement of the hook part 130 towards the second negative direction Y2 by abutting the end face 132 against the inner side 312.

The bevel face 131 of the hook part 130 is particularly advantageous for switching the stabilizing apparatus 100 from the first state to the second state. Specifically, during the transition from the first state to the second state, the bevel face 131 can slide while abutting against a corresponding edge of an opening, so that it is relatively easy for the hook part 130 to smoothly slide to reach the inner side 312 of the end panel 310, without forming a big obstacle for blocking the hook part 130 from entering the inner side 132.

Figure 5:
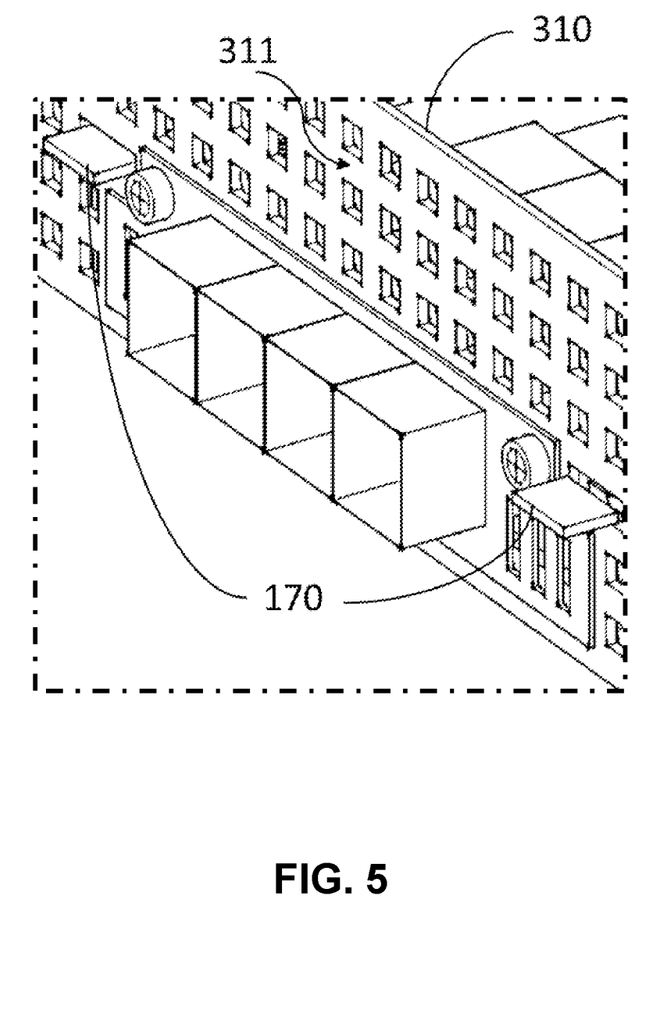
FIG. 5 illustrates an external, partial view of the stabilizing apparatus according to an embodiment of the present disclosure.

With reference to FIG. 5, in some embodiments, the stabilizing apparatus 100 may also include a manipulation part 170, which is coupled to the end face 132 (FIG. 4) of the transmission pole 120 and is substantially exposed at the outer side 311 of the end panel 310 to receive user's operations. Specifically, the manipulation part 170 can be operated to, when receiving a push operation along the second positive direction Y1, push the hook part 130 into the inner side 312 of the end panel 310 of the chassis 300, so as to switch the stabilizing apparatus 100 from the first state to the second state. In addition, the manipulation part 170 also can be operated, when receiving a press operation along the first positive direction Z1, to release at least a portion of the hook part 130 from the inner side 312 to the outer side 311 (FIG. 4), so as to switch the contact part 110 from the second state back to the first state.

Returning to FIG. 2, in some embodiments, the stabilizing apparatus 100 may also include a first spring 140 and a second spring 150. The first spring 140 is coupled to the contact part 110 for generating a force that resists the movement of the contact part 110 towards the first positive direction Z1. The second spring 150 is coupled to the transmission pole 120 for generating a force that resists the movement of the transmission pole 120 towards the second positive direction Y1. The use of the first spring 140 and the second spring 150 can stabilize, by means of the counterforce provided by themselves (caused by compression), the push operation of the operators to a certain extent, which in turns provides good haptic feedback to the user.

Furthermore, during the process of switching the contact part 110 from the second state to the first state, the first spring 140 also can rely on its released resilient force to move the contact part 110 along the first negative direction Z2 without any external forces. The first negative direction Z2 is oriented opposite to the first positive direction Z1. The second spring 150 also can rely on its released resilient force to move the transmission pole 120 along the second negative direction Y2 without any external forces. In this way, both the transmission pole 120 and the contact part 110 can be automatically "bounced back" to a position corresponding to the first state, which implements a simple and efficient state switching operation.

It should be understood that the above detailed embodiments of the present disclosure are only intended for illustrating or explaining principles of the present disclosure, rather than restricting the present disclosure. Therefore, any modifications, equivalent substitutions and improvements, without deviating from the spirit and scope of the present invention, should be included within the protection scope of the present invention. Meanwhile, the claims attached to the present disclosure aim to cover all changes and modifications falling within the scope and boundary of the claims or equivalents of the scope and boundary.

What is claimed is:

1. An apparatus, comprising:
   a chassis configured for mounting to a storage device, the chassis including an end panel defining a panel opening configured for reception of a plug-in card, the chassis configured to support the plug-in card; and
   a stabilizer mounted to the chassis, the stabilizer including:
      a contact part movable towards the plug-in card supported by the chassis along a first direction to contact the plug-in card; and
      a transmission pole operatively coupled to the contact part, the transmission pole movable in a second direction transverse to the first direction, the transmission pole configured such that movement of the transmission pole in the second direction causes corresponding movement of the contact part in the first direction to contact the plug-in card.

2. The apparatus of claim 1, wherein:
   the plug-in card comprises an exposed metal part that is electrically coupled to a circuit board in the plug-in card; and
   the contact part is operable to contact the metal part.

3. The apparatus of claim 1, wherein:
   the contact part comprises a first contact surface, the first contact surface arranged at an oblique angle with respect to the second direction; and
   the transmission pole comprises a second contact surface that is form-fitted with the first contact surface and disposed opposite to the first contact surface, and the second contact surface is adapted to move while abutting against the first contact surface when the transmission pole moves along the second direction, so as to move the contact part along the first direction.

4. The apparatus of claim 1:
   wherein the contact part is configured for reciprocal movement in a first positive direction of the first direction and a first negative direction of the first direction;
   wherein the transmission pole is configured for reciprocal movement in a second positive direction of the second direction and a second negative direction of the second direction;
   wherein movement of the contact part in the first positive direction and the transmission pole in the second positive direction causes the contact part to assume a locked state in contact with the plug-in card; and
   wherein movement of the contact part in the first negative direction and the transmission pole in the second negative direction causes the contact part to assume a released state released from the plug-in card.

5. The apparatus of claim 4, further comprising:
   a hook part coupled to the transmission pole, the hook part comprising a bevel face and an end face;
   wherein at least a portion of the hook part is operable to extend to an outer side of the end panel of the chassis to engage the outer side when in the released state of the plug-in card and limit via the bevel face movement of the hook part and the transmission pole towards the second positive direction.

6. The apparatus of claim 5, wherein in the locked state of the plug-in card where the contact part contacts the plug-in card, the hook part is operable to retract to an inner side of the end panel of the chassis to limit movement of the hook part and the transmission pole towards the second negative direction by abutting the end face of the hook part against the inner side of the end panel of the chassis.

7. The apparatus of claim 6, further comprising:
a first spring coupled to the contact part and adapted for generating a force that resists movement of the contact part towards the first positive direction; and
a second spring coupled to the transmission pole and adapted for generating a force that resists movement of the transmission pole towards the second positive direction.

8. The apparatus of claim 7, further comprising:
a manipulation part coupled to the end face of the transmission pole, wherein the manipulation part is operable to:
in response to receiving a push operation along the second positive direction, push the hook part to the inner side of the end panel of the chassis, such that the contact part contacts the plug-in card to assume the locked state; and
in response to receiving a press operation along the first positive direction, release at least a portion of the hook part from the inner side to the outer side, so as to lose the contact between the contact part and the plug-in card to assume the released state.

9. The apparatus of claim 8, wherein during the loss of contact between the contact part and the plug-in card, the first spring is further adapted for moving the contact part along the first negative direction, wherein the first negative direction is oriented opposite to the first positive direction and the second spring is further adapted for moving the transmission pole along the second negative direction.

10. An apparatus, comprising:
a chassis configured for supporting a plug-in card; and
a stabilizer mounted to the chassis, the stabilizer including:
a contact part movable towards the plug-in card supported on the chassis along a first direction perpendicular to a plane of the plug-in card, so as to contact the plug-in card; and
a transmission pole operatively coupled to the contact part, the transmission pole movable in a second direction transverse to the first direction, the transmission pole configured such that movement of the transmission pole in the second direction causes corresponding movement of the contact part in the first direction to contact the plug-in card.

11. The apparatus of claim 10, wherein the plug-in card comprises an exposed metal part that is electrically coupled to a circuit board in the plug-in card and wherein the contact part of the stabilizer is operable to contact the metal part, so as to electrically couple the plug-in card to the chassis.

12. The apparatus of claim 10, wherein the contact part of the stabilizer comprises a first contact surface, the first contact surface arranged at an oblique angle with respect to the second direction, and the transmission pole comprises a second contact surface that is form-fitted with the first contact surface and disposed opposite to the first contact surface;

wherein the second contact surface is adapted to move while abutting against the first contact surface when the transmission pole moves along the second direction, so as to move the contact part along the first direction.

13. The apparatus of claim 10:
wherein the contact part is configured for reciprocal movement in a first positive direction of the first direction and a first negative direction of the first direction;
wherein the transmission pole is configured for reciprocal movement in a second positive direction of the second direction and a second negative direction of the second direction;
wherein movement of the contact part in the first positive direction and the transmission pole in the second positive direction causes the contact part to assume a locked state in contact with the plug-in card; and
wherein movement of the contact part in the first negative direction and the transmission pole in the second negative direction causes the contact part to assume a released state released from the plug-in card.

14. The apparatus of claim 13, wherein the stabilizer includes a hook part coupled to the transmission pole, the hook part comprising a bevel face and an end face;
wherein at least a portion of the hook part is operable to extend to an outer side of an end panel of the chassis to engage the outer side when in the released state of the plug-in card and limit via the bevel face movement of the hook part and the transmission pole towards the second positive direction.

15. The apparatus of claim 14, wherein in the locked state of the plug-in card where the contact part contacts the plug-in card, the hook part is operable to retract to an inner side of the end panel of the chassis to limit movement of the hook part and the transmission pole towards the second negative direction by abutting the end face of the hook part against the inner side of the end panel of the chassis.

16. A method, comprising:
supporting a plug-in card within a chassis mounted to a storage device;
mounting a stabilizer to the chassis;
electrically coupling a contact part of the stabilizer to the chassis;
moving the contact part of the stabilizer toward the plug-in card supported on the chassis along a first direction perpendicular to a plane of the plug-in card, such that the contact part contacts the plug-in card;
coupling a transmission pole to the contact part; and
moving the transmission pole in a second direction transverse to the first direction to cause corresponding movement of the contact part in the first direction to contact the plug-in card.

17. The method of claim 16, wherein the plug-in card comprises an exposed metal part that is electrically coupled to a circuit board in the plug-in card and further including:
causing contact of the contact part of the stabilizer with the metal part, so as to electrically couple the plug-in card to the chassis.

18. The method of claim of claim 16, wherein the contact part comprises a first contact surface, the first contact surface arranged at an oblique angle with respect to the second direction, and wherein the transmission pole comprises a second contact surface that is form-fitted with the first contact surface and disposed opposite to the first contact surface, and further including:

moving the transmission pole along the second direction to move the second contact surface along the first contact surface to thereby move the contact part along the first direction.

19. The method of claim 16:
wherein the contact part is configured for reciprocal movement in a first positive direction of the first direction and a first negative direction of the first direction;
wherein the transmission pole is configured for reciprocal movement in a second positive direction of the second direction and a second negative direction of the second direction;
wherein movement of the contact part in the first positive direction and the transmission pole in the second positive direction causes the contact part to assume a locked state in contact with the plug-in card; and
wherein movement of the contact part in the first negative direction and the transmission pole in the second negative direction causes the contact part to assume a released state released from the plug-in card.

20. The method of claim 19:
wherein the stabilizer includes a hook part coupled to the transmission pole and has a bevel face and an end face;
wherein, when in the released state of the plug-in card, further including:
  limiting movement of the hook part and the transmission pole towards the second positive direction by engagement of the hook part with an outer side of an end panel of the chassis; and
wherein, when in the locked state of the plug-in card, further including:
  limiting movement of the hook part and the transmission pole towards the second negative direction by abutting the end face of the hook part against an inner side of the end panel of the chassis.

* * * * *